United States Patent [19]

Kumagai

[11] Patent Number: 5,421,440
[45] Date of Patent: Jun. 6, 1995

[54] CONTROL SYSTEM FOR AUTOMOTIVE CLUTCH

[75] Inventor: Tomoharu Kumagai, Tokyo, Japan

[73] Assignee: Honda Giken Kogyo Kabushiki Kaisha, Tokyo, Japan

[21] Appl. No.: 112,705

[22] Filed: Aug. 26, 1993

[30] Foreign Application Priority Data

Aug. 31, 1992 [JP] Japan ................. 4-255912

[51] Int. Cl.⁶ .................. F16D 48/08; F16D 28/00
[52] U.S. Cl. ................... 192/90; 192/103 R; 477/175; 477/179
[58] Field of Search ............ 192/103 C, 103 R, 84 R, 192/90; 477/180, 176, 175, 174, 179

[56] References Cited

U.S. PATENT DOCUMENTS

| | | | |
|---|---|---|---|
| 4,295,551 | 10/1981 | Zimmermann et al. | 477/176 X R |
| 4,403,682 | 9/1983 | Norris et al. | 477/175 |
| 4,413,714 | 11/1983 | Windsor | 477/175 |
| 4,651,855 | 3/1987 | Grunberg | 192/103 C X |
| 4,667,787 | 5/1987 | Hofmann | 477/175 |
| 4,766,544 | 8/1988 | Kurihara et al. | 477/176 X R |
| 5,050,714 | 9/1991 | Kurihara et al. | 192/103 R X |
| 5,056,639 | 10/1991 | Petzold et al. | 477/176 |

FOREIGN PATENT DOCUMENTS

| | | | |
|---|---|---|---|
| 57-182530 | 11/1982 | Japan . | |
| 6247742 | 11/1982 | Japan . | |
| 64-21025 | 2/1989 | Japan . | |
| 1-122741 | 5/1989 | Japan | 477/175 |

*Primary Examiner*—Rodney H. Bonck
*Attorney, Agent, or Firm*—Lyon & Lyon

[57] ABSTRACT

An automatic transmission on an automobile is combined with a friction clutch coupled between the output shaft of an engine and the input shaft of the automatic transmission. The friction clutch is controlled selectively for engagement and disengagement by an electric actuator. The electric actuator is controlled by a controller to engage the friction clutch in a feedback loop such that the rate of change of the rotational speed of the engine is zero when the power from the engine starts to be transmitted by the friction clutch to the automatic transmission.

6 Claims, 8 Drawing Sheets

CONTROL SYSTEM FOR AUTOMOTIVE CLUTCH

BACKGROUND OF THE INVENTION

1. Field of the Invention

The present invention relates to a control system for controlling engagement of an automotive clutch which is disposed in a power transmitting path from an engine to driven road wheels for controlling transmission of engine power through the power transmitting path.

2. Description of the Prior Art

Automotive clutches are usually disposed between the output shaft of an engine and the input shaft of a transmission for controlling transmission of power from the engine through the transmission to driven road wheels. Such an automotive clutch has heretofore been used as a clutch associated with a manual transmission, and engaged and disengaged in response to operation by the driver of the clutch pedal when the automobile is to be started or stopped or a shift is to be made by the transmission.

Automatic transmissions are generally combined with a torque converter coupled to the output shaft of an engine. However, some recent automatic transmissions are combined with automotive clutches. There have been proposed various control systems and methods for automatically smoothly and quickly engaging and disengaging automotive clutches that are associated with automatic transmissions.

For example, Japanese patent publication No. 62-47742 discloses a clutch control apparatus having an actuator which operates in a direction to engage a clutch. When a negative rate of change of the rotational speed of the engine is detected, the operation of the actuator in the direction to the clutch is stopped and the actuator is held in the stopped condition. When a positive rate of change of the rotational speed of the engine is detected, the actuator is activated in the direction to engage the clutch.

When the rate of change of the engine rotational speed becomes negative, i.e., when the engine rotational speed changes so as to be lower, the operation of the clutch to engage itself is interrupted to prevent the engine rotational speed from being decreasing excessively. Therefore, insofar as the rate of change of the engine rotational speed is positive, i.e., the engine rotational speed monotonously increases, the clutch is controlled to engage itself based on the characteristics of the actuator. In the event that the output power of the engine varies, however, it is difficult to control the clutch for smooth engagement because the engine rotational speed tends to fluctuate.

Japanese utility model publication No. 84-21025 discloses an apparatus for controlling engagement of a clutch of an automobile. When the clutch is connected by an actuator to start the automobile, the apparatus compares a predetermined target rate of change for the engine rotational speed with the actual rate of change of the engine rotational speed, and corrects the amount of operation of the clutch based on the result of comparison to cause the actual rate of change of the engine rotational speed to approach the predetermined target rate of change for the engine rotational speed.

The target rate of change for the engine rotational speed is a function of time. Since the torque that is transmitted through the engaged clutch varies with time, the transmission tends to be subject to shocks while gear shifts are being made and when gear shifts are completed.

SUMMARY OF THE INVENTION

It is therefore an object of the present invention to provide a clutch control system for engaging a clutch of an automobile smoothly without shocks when the automobile is to be started.

Another object of the present invention is to provide a clutch control system which is relatively simple in structure.

Still another object of the present invention is to provide a clutch control system capable of controlling a clutch of an automobile for smooth engagement by eliminating changes in the difference between the torque produced by the engine on the automobile and the torque required to engage the clutch when the clutch is engaged.

Yet another object of the present invention is to provide a clutch control system capable of controlling a clutch of an automobile for smooth engagement by eliminating the difference between the torque produced by the engine on the automobile and the torque required to engage the clutch when the clutch is engaged.

According to the present invention, there is provided a control system for controlling an automotive clutch, comprising a power transmitting path extending from an engine to a driven system, clutch means disposed in the power transmitting path for controlling transmission of power from the engine through the power transmitting path to the driven system, a clutch actuator for controlling the clutch means selectively for engagement and disengagement, and control means for controlling the clutch actuator to engage the clutch means in a feedback loop such that a torque transmitted through said clutch means is equal to an engine output torque when the power from the drive unit starts to be transmitted through the power transmitting path by the clutch means.

Further according to the another present invention, there is provided a control system for controlling an automotive clutch, comprising a power transmitting path extending from a drive unit to a driven system, clutch means disposed in the power transmitting path for controlling transmission of power from the drive unit through the power transmitting path to the driven system, a clutch actuator for controlling the clutch means selectively for engagement and disengagement, detecting means for detecting a rate of change of a rotational speed of the drive unit, and control means for controlling the clutch actuator to engage the clutch means in a feedback loop such that the rate of change of the rotational speed of the drive unit is zero when the power from the drive unit starts to be transmitted through the power transmitting path by the clutch means.

FIG. 9 of the accompanying drawings shows a model of a power transmitting system of an automobile having a clutch, with the friction of the power transmitting system being ignored. In the illustrated model, the inertia of a rotating system coupled to the output shaft of an engine E is designated by "Ie", and the inertia of a driven system coupled to the output shaft of a clutch CL is designated by "Io". Therefore, the difference between the output torque Te of the engine E and the torque Tc transmitted by the engaged clutch CL serves as a torque to rotate the rotating system with the inertia Ie. If the rate of change of the rotational speed of the engine E is indicated by dNe/dt, then the following equation is satisfied:

$$Te - Tc = Ie \cdot dNe/dt \qquad (1)$$

If the speed reduction ratio from the clutch CL to the wheels is represented by R and the torque to drive the wheels by To, then the torque To is expressed by:

$$To = Tc \cdot R \qquad (2)$$

By substituting the equation (2) in the equation (1), the torque To is given as follows:

$$To = R \cdot (Te - Ie \cdot dNe/dt) \qquad (3)$$

As can be understood from the equation (3), the torque To is calculated by multiplying the speed reduction ratio R by the difference between the engine output torque Te and the product of the inertia Ie and the rate dNe/dt of change of the rotational speed of the engine E, i.e., the torque required to vary the inertia Ie at the rate dNe/dt of change of the rotational speed of the engine E.

The equation (1) indicates that controlling the clutch CL to make the rate dNe/dt constant means controlling the clutch CL to make the difference between the actual engine output torque and the torque Tc transmitted through the engaged clutch CL. Particularly when the clutch is controlled so that the rate dNe/dt is zero, the clutch is controlled so that Te=Tc.

Since the clutch is controlled so that dNe/dt=zero, the engine output torque Te is always equal to the torque Tc as long as the clutch is controlled for engagement. Therefore, the clutch can be engaged smoothly. Inasmuch as Te=Tc when the engagement of the clutch is completed, no torque change is experience from a partly engaged condition to a fully engaged condition of the clutch, with the result that any shocks produced when the clutch is engaged are minimized.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENTS

Figure 1:
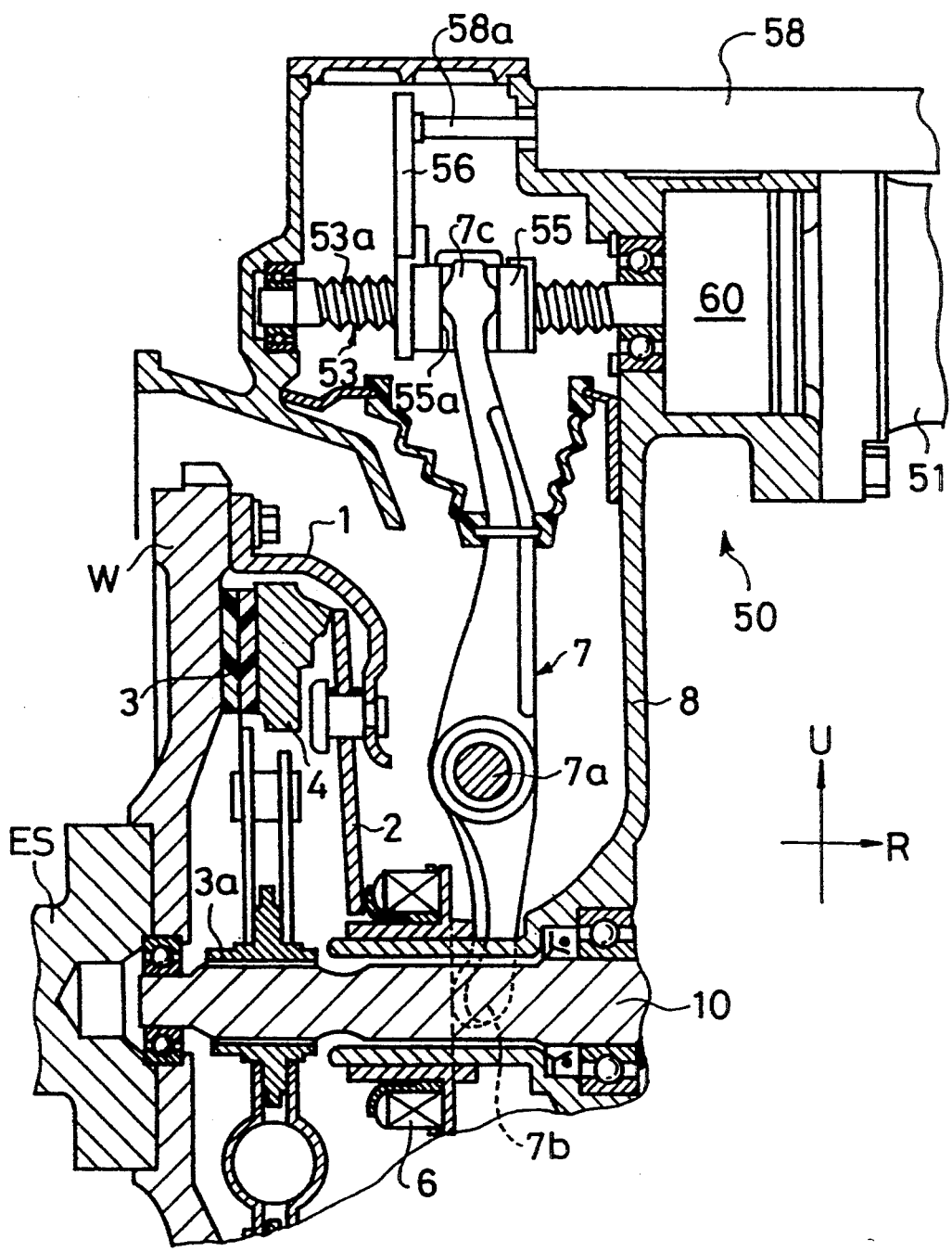
FIG. 1 is a fragmentary cross-sectional view of a main clutch to be controlled by a clutch control system according to the present invention.
Figure 2:
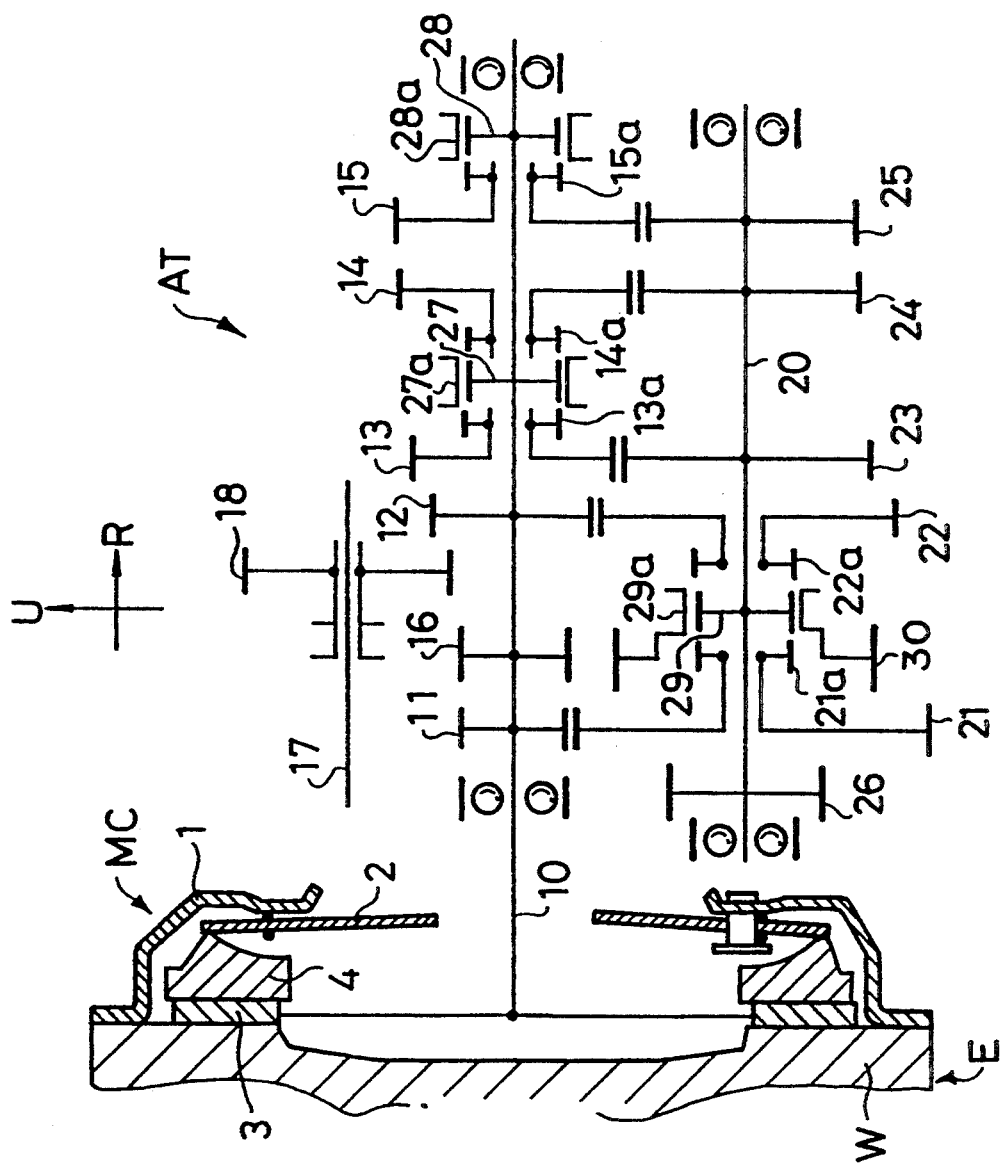
FIG. 2 is a diagram showing a skeleton of the power transmitting system of an automatic transmission which has the main clutch shown in FIG. 1.
Figure 3:
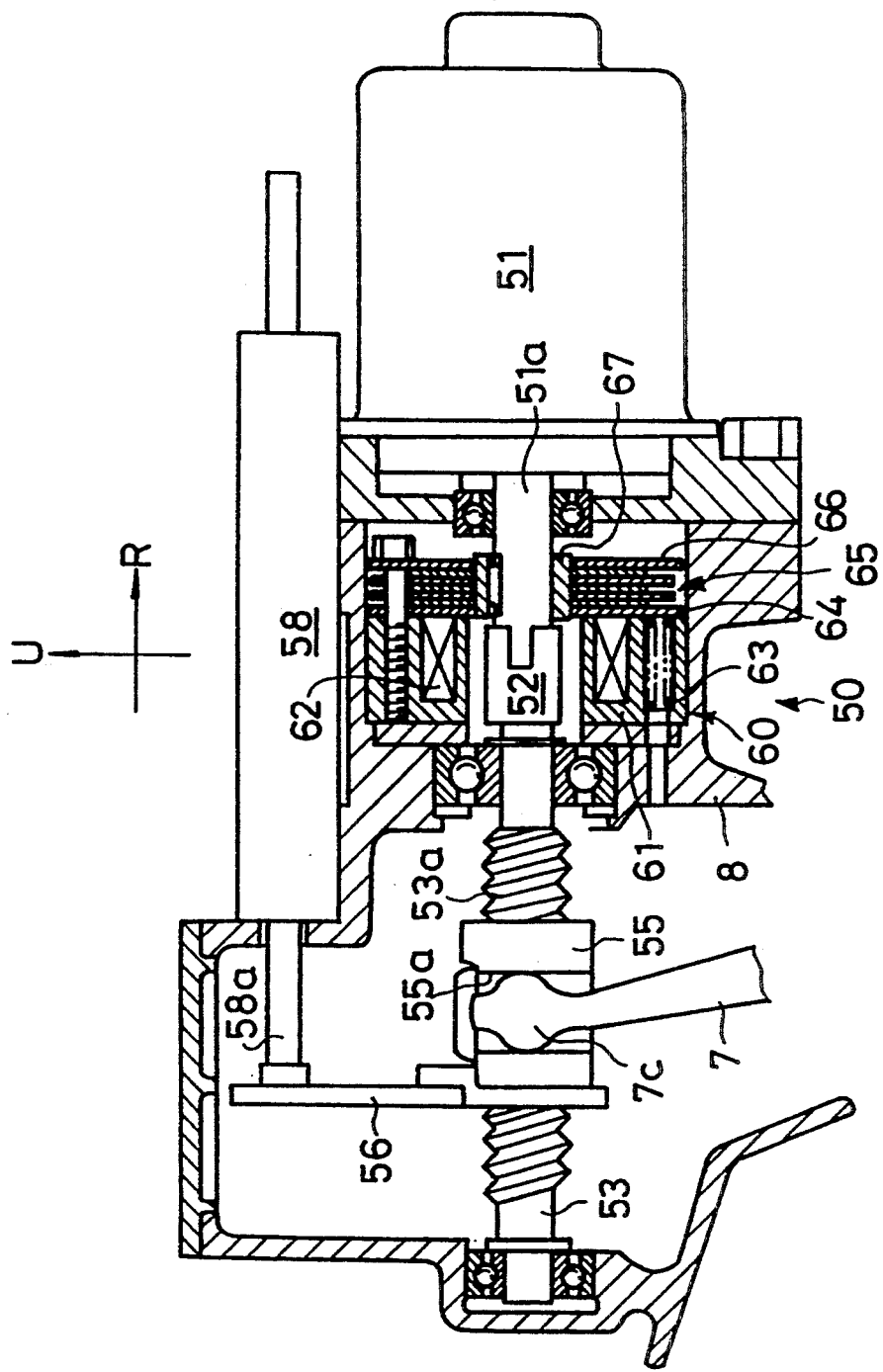
FIG. 3 is a cross-sectional view of an actuator for controlling operation of the main clutch.

In FIGS. 1 through 3, the direction indicated by the arrow U is an upward direction and the direction indicated by the arrow R is a rightward direction. These upward and rightward directions U, R are indicated to show relative orientations of a main clutch, an actuator, and an automatic transmission shown in FIGS. 1 through 3.

A clutch control system according to the present invention is typically used to control operation of a main clutch MC (see FIG. 2) associated with an automatic transmission AT on an automobile for selectively connecting and disconnecting an output shaft ES of an engine E and the input shaft of the automatic transmission AT. The automatic transmission AT is of basically the same structure as a conventional manual transmission except that selected gears are brought into mesh with each other by electric motors (described later on) rather than by manual forces.

The power transmitting system of the automatic transmission AT is schematically shown in FIG. 2. As shown in FIG. 2, the automatic transmission AT is coupled to the main clutch MC that is attached to a flywheel W of the engine E.

As shown in FIG. 1, the main clutch MC comprises a cover 1 fastened to the flywheel W, a friction disk 3 housed in the cover 1 and sandwiched between a pressure plate 4 and the flywheel W, and a diaphragm spring 2 supported by the cover 1 for normally pressing the pressure plate 4 against the friction disk 3.

Normally, the friction disk 3 is clamped between the pressure plate 4 and the flywheel W under the bias of the diaphragm spring 2 so that the friction disk 3 rotates in unison with the output shaft ES of the engine E. The friction disk 3 has a radially inner hub 3a fitted over and splined to a main shaft 10 of the automatic transmission AT. Therefore, the main shaft 10 and the output shaft ES are normally connected to each other by the friction disk 3.

A release bearing 6 is axially movably disposed around the main shaft 10 for axially pressing a radially inner edge of the diaphragm spring 2. The release bearing 6 is axially engaged by an end 7b of a release fork 7 that is angularly movably supported at its intermediate portion 7a in a transmission housing 8. The release fork 7 has an opposite end 7c operatively coupled to a slider sleeve 55 of an electric actuator 50.

When the slider 55 is moved to the right, the end 7c of the release fork 7 is also moved to the right, turning the release fork 7 clockwise about the intermediate portion 7a. The end 7b of the release fork 7 pushes the release bearing 6 to the left, which in turn pushes the radially inner edge of the diaphragm spring 2 to the left, releasing the pressure plate 4. The friction disk 3 is now freed from the pressure plate 4. The output shaft ES and the main shaft 10 are disconnected from each other, i.e., the main clutch MC is disengaged.

When the slider sleeve 55 is moved to the left, the release fork 7 is turned counterclockwise, the release bearing 6 is moved to the right, and the diaphragm spring 2 presses the pressure plate 4 against the friction disk 3. The main clutch MC is therefore engaged.

The torque that can be transmitted through the main clutch MC, i.e., the torque capacity of the main clutch MC, can be controlled by controlling the position of the slider 55 with the electric actuator 50 thereby to control the stroke or axial position of the release bearing 6. The stroke of the release bearing 6, i.e., the clutch stroke, is commensurate with the torque capacity of the main clutch MC. If the main clutch MC comprises a dry-type friction clutch as illustrated, then the clutch stroke is substantially proportional to the torque capacity of the main clutch MC.

As shown in FIG. 3, the electric actuator 50 comprises an electric motor 51 mounted on the transmission housing 8 and having an output shaft 51a, a rotatable shaft 53 coaxially coupled to the output shaft 51a by a coupling 52 and rotatably supported in the transmission housing 8, and an electromagnetic brake 60 disposed around the output shaft 51a and the coupling 52 for electromagnetically braking the output shaft 51a against rotation. The rotatable shaft 53 has a ball screw 53a over which the slider sleeve 55 is threaded with a ball screw mechanism (not shown) between the ball screw 53a and the slider sleeve 55. Therefore, when the electric motor 51 is energized to rotate the shaft 53 about its own axis, the slider sleeve 55 moves axially on the ball screw 53a of the shaft 53. Stated otherwise, the ball screw mechanism converts the rotation of the shaft 53 into axial movement of the slider sleeve 55.

The slider sleeve 55 has a groove 55a defined in an outer surface thereof, and the end 7c of the release fork 7 is inserted in the groove 55a. Therefore, the release fork 7 is operatively coupled to the slider sleeve 55. Upon axial movement of the slider sleeve 55, the release fork 7 is angularly moved about the intermediate portion 7a for thereby engaging or disengaging the main clutch MC.

To the slider sleeve 55, there is connected a shaft 58a of a stroke sensor 58 through a connecting plate 56. The stroke sensor 58 serves to detect the axial position of the slider sleeve The electromagnetic brake 60 comprises a body 61 fixedly mounted in the transmission housing 8, an electromagnetic coil 62 disposed in the body 61, a compression spring 63 also disposed in the body 61, and a brake disk assembly 65 located between a pressure plate 64 movably positioned on one side of the brake disk assembly 65 and an end plate 66 positioned on the other side of the brake disk assembly 65 and fastened to the body 61. The brake disk assembly 65 is mounted on and joined to a hub 67 keyed to the output shaft 51a of the electric motor 51. The pressure plate 64 is normally urged by the compression spring 63 in a direction to press the brake disk assembly 65 against the end plate 66. When the electromagnetic coil 62 is de-energized, the pressure plate 64 is moved to the right under the bias of the compression spring 63, pressing the brake disk assembly 65 between the pressure plate 64 and the end plate 66 under the bias of the compression spring 63. The disk brake assembly 65 is now held against rotation braking the shaft 51a against rotation. When the electromagnetic coil 62 is energized, the pressure plate 64 is moved to the left under electromagnetic forces generated thereby against the bias of the compression spring 63. The brake disk assembly 65 is now released from the clamped engagement with the pressure plate 64 and the end plate 66, and freed for rotation. The shaft 51a is thus rendered freely rotatable.

When the shaft 53 is rotated by the electric motor 51 to switch the main clutch MC from its engaged or disengaged condition, the electromagnetic brake 60 is actuated to free the shaft 51a and hence the shaft 53. When the main clutch MC is to be kept in its engaged or disengaged condition, e.g., when the main clutch MC is to remain engaged, disengaged, or partly engaged, the electromagnetic brake 60 is inactivated holding the shaft 51a and hence the shaft 53 against rotation. At this time, the electric motor 51 is de-energized for lower power consumption.

As shown in FIG. 2, the automatic transmission AT comprises a first-speed drive gear 11, a reverse drive gear 16, a second-speed drive gear 12, a third-speed drive gear 13, a fourth-speed drive gear 14, and a fifth-speed drive gear 15, successively arranged from the left in the order named, all of which are mounted on the main shaft 10. The first-speed drive gear 11, the reverse drive gear 18, and the second-speed drive gear 12 are fixedly joined to the main shaft 10, whereas the third-speed drive gear 13, the fourth-speed drive gear 14, and the fifth-speed drive gear 15 are rotatably disposed on the main shaft 10.

The automatic transmission AT also includes a countershaft 20 rotatably positioned below the main shaft 10 and extending parallel thereto. The automatic transmission AT also has an output gear 26, a first-speed driven gear 21, a reverse driven gear 30, a second-speed driven gear 22, a third-speed driven gear 23, a fourth-speed driven gear 24, and a fifth-speed driven gear 25, successively arranged from the left in the order named, all of which are mounted on the countershaft 20. The output gear 28, third-speed drives gear 23, the fourth-speed driven gear 24, and the fifth-speed driven gear 25 are fixedly joined to the countershaft 20, whereas the first-speed driven gear 21 and the second-speed driven gear 22 are rotatably disposed on the countershaft 20. The reverse driven gear 30 is coupled to the countershaft 20 through a third hub 29.

The first-speed drive gear 11, the second-speed drive gear 12, the third-speed drive gear 13, the fourth-speed drive gear 14, and the fifth-speed drive gear 15 are held in mesh with the first-speed driven gear 21, the second-speed driven gear 22, the third-speed driven gear 23, the fourth-speed driven gear 24, and the fifth-speed driven gear 25, respectively, providing first through fifth power transmitting paths, respectively.

A first hub 27 coupled to the main shaft 10 is positioned axially between the third-speed drive gear 13 and the fourth-speed drive gear 14 on the main shaft 10. A third-speed clutch gear 13a and a fourth-speed clutch gear 14a, which are coupled to the third-speed drive gear 13 and the fourth-speed drive gear 14, respectively, are disposed one on each side of, and axially adjacent to, the first hub 27. When a first sleeve 27a axially movably disposed on the first hub 27 is axially moved into mesh with the third-speed clutch gear 13a or the fourth-speed clutch gear 14a, the third-speed drive gear 13 or the fourth-speed drive gear 14 is coupled to the main shaft 10 for corotation. The clutch gears 13a, 14a are associated with respective synchronizing mechanisms (not shown).

A second hub 28 coupled to the main shaft 10 is positioned on the right-hand side of the fifth-speed drive gear 15. The fifth-speed drive gear 15 is coupled to a fifth-speed clutch gear 15a that is positioned on one side of, and axially adjacent to, the second hub 28. When a second sleeve 28a axially movably disposed on the second hub 28 is axially moved into mesh with the fifth-speed clutch gear 15a, the fifth-speed drive gear 15 is coupled to the main shaft 10 for corotation. The fifth-speed clutch gear 15a is associated with a synchronizing mechanism (not shown).

Similarly, the third hub 29 is coupled to the main shaft 10 and positioned axially between the first-speed driven gear 21 and the second-speed driven gear 22 on the countershaft 20. A first-speed clutch gear 21a and a second-speed clutch gear 22a, which are coupled to the first-speed driven gear 21 and the second-speed driven gear 22, respectively, are disposed one on each side of, and axially adjacent to, the third hub 29. When a third sleeve 29a axially movably disposed on the third hub 29 is axially moved into mesh with the first-speed clutch gear 21a or the second-speed clutch gear 22a, the first-speed driven gear 21 or the second-speed driven gear 22 is coupled to the countershaft 20 for corotation.

The automatic transmission AT has a fixed reverse shaft 17 extending parallel to the main shaft 10. A reverse idler gear 18 is rotatably and axially movably disposed on the reverse shaft 17. When the reverse idler gear 18 is axially moved from the illustrated position, it meshes with the reverse drive gear 18 and the reverse driven gear 30, establishing a reverse power transmitting path.

When the first, second, and third sleeves 27a, 28a, 29a and the reverse idler gear 18 are selectively axially moved, one of the first through fifth power transmitting paths and the reverse power transmitting path is selected to effect a gear shift. Specifically, one of shift forks (not shown) engaging the first, second, and third sleeves 28a, 29a and the reverse idler gear 18, respectively, is axially moved to make the gear shift as with the conventional manual transmissions.

In the manual transmissions, the shift forks are manually moved. In the automatic transmission AT, however, the shift forks are axially moved by a shifting motor 31 and a selecting motor 32 shown in FIG. 4.

The main clutch MC is also actuated when gear shifts are made and also when the automobile is started and stopped.

Figure 6:
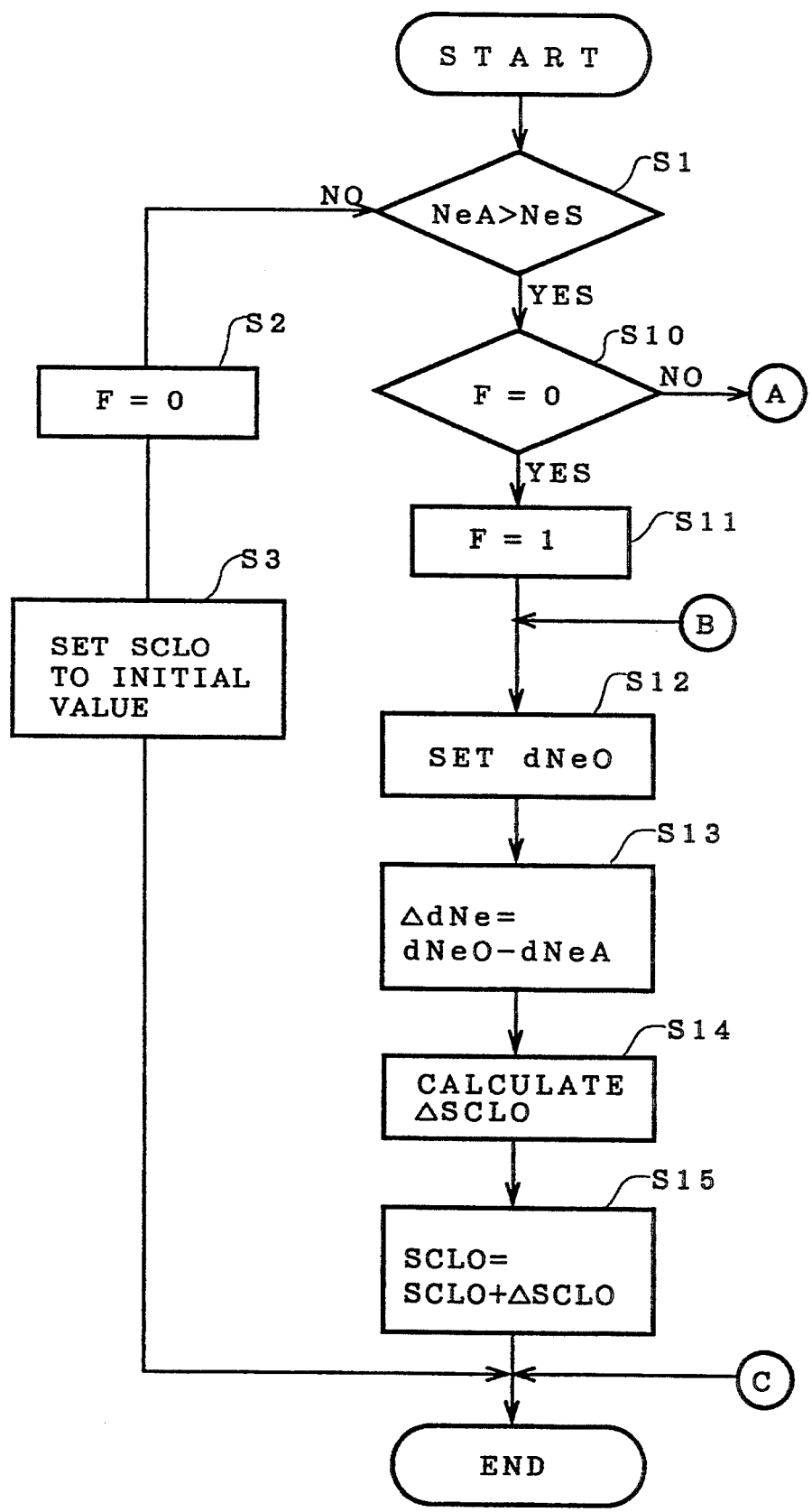
FIGS. 6 and 7 are a flowchart of a process of controlling the main clutch with the clutch control system.

A transmission control apparatus for controlling the automatic transmission AT will be described below with reference to FIGS. 4 and 6.

Figure 4:
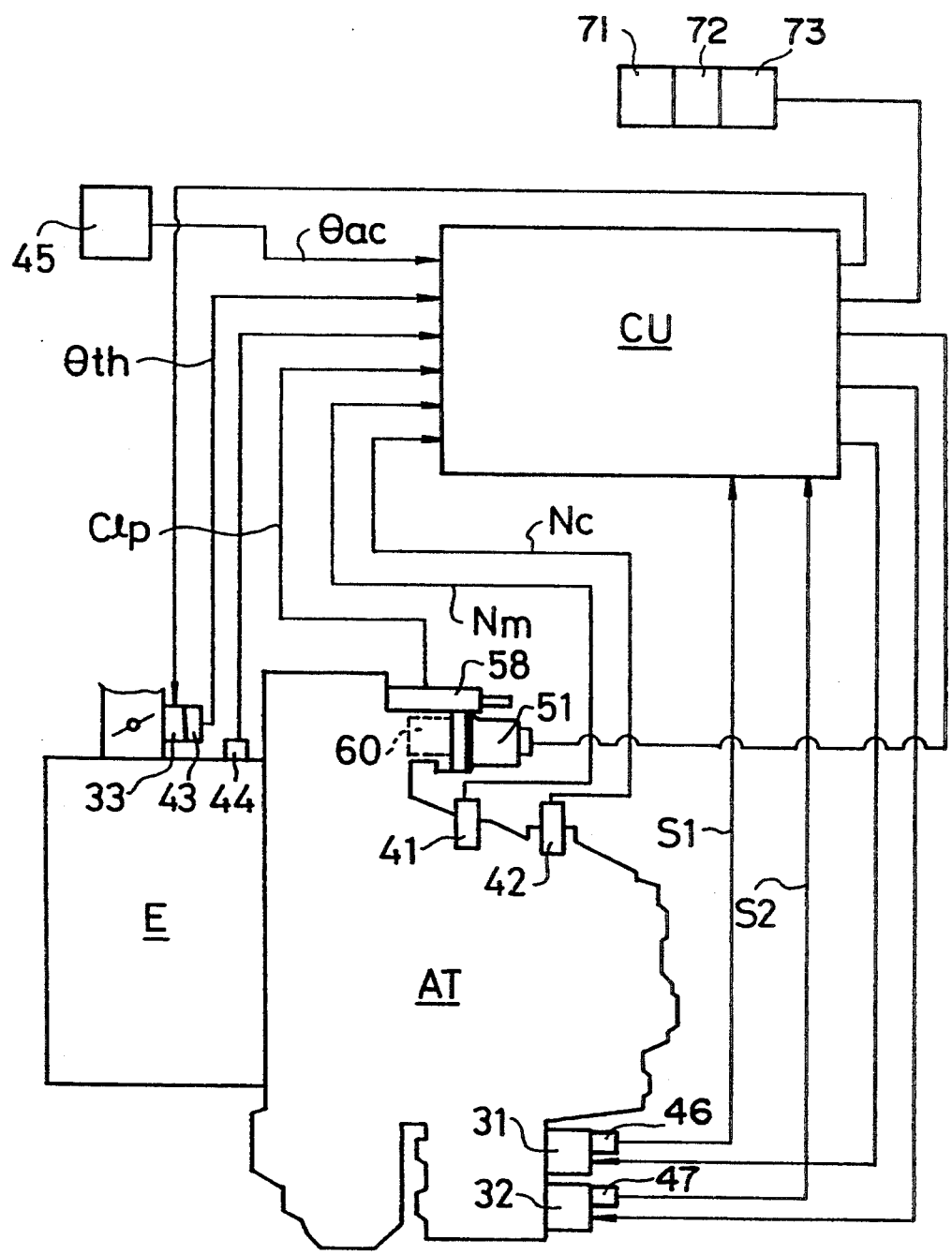
FIG. 4 is a schematic diagram, partly in block form, of a transmission control apparatus for controlling the automatic transmission shown in FIG. 2, the transmission control apparatus incorporating the clutch control system.
Figure 5:
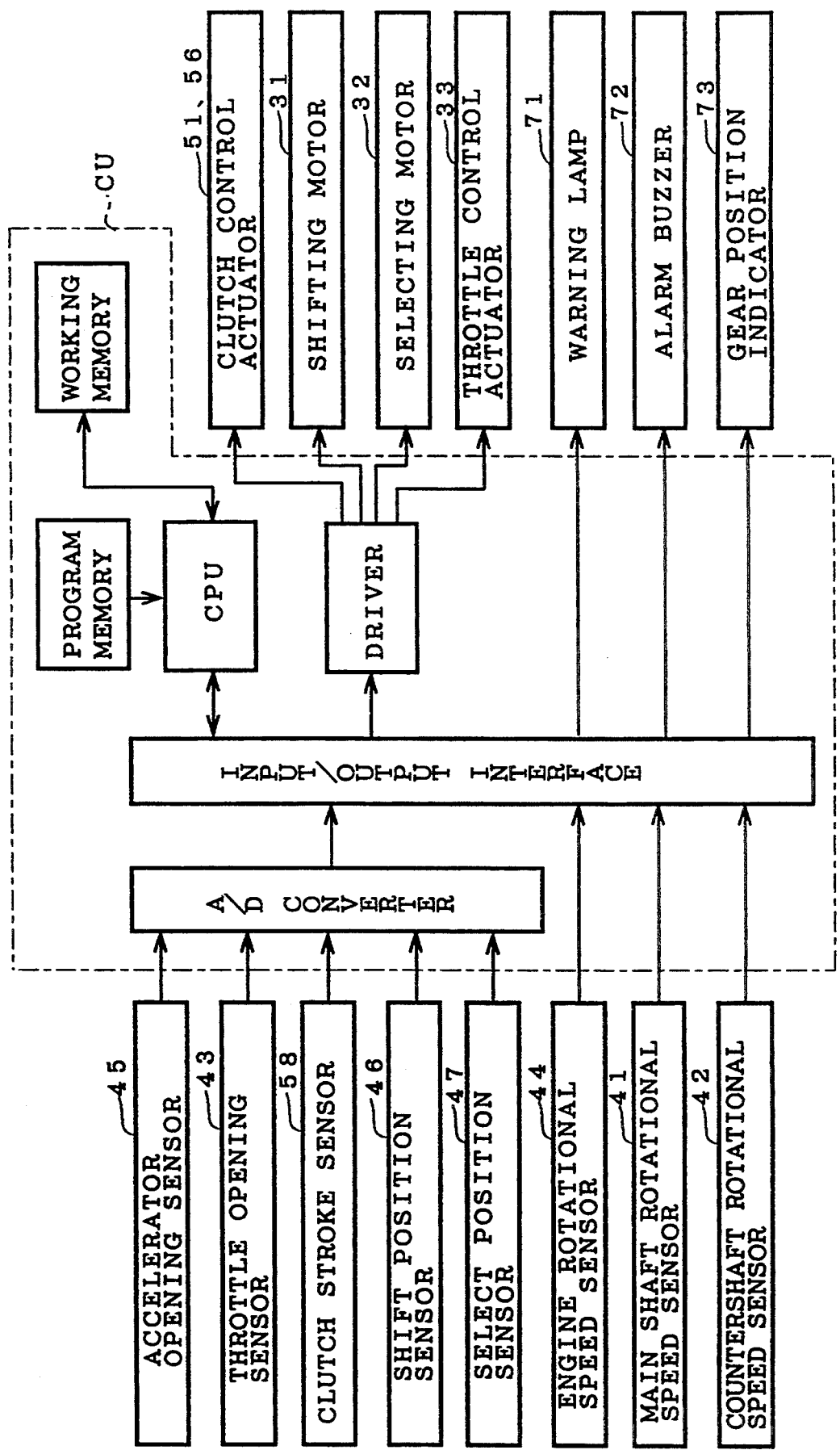
FIG. 5 is a block diagram of the transmission control apparatus.

As shown in FIGS. 4 and 5, the transmission control apparatus has a controller CU which generate control signals to control operation of a clutch control actuator composed of the electric motor 51 and electromagnetic brake 60 of the electric actuator 50, a shift control actuator composed of the shifting motor 31, a select control actuator composed of the selecting motor 32, and a throttle control actuator 33. The controller CU also generate control signals to control a warning lamp 71 and an alarm buzzer 72 and to display gear positions on a gear position indicator 73.

The controller CU is supplied with an actuated position signal S1 indicating an actuated position of the shifting motor 31 as detected by a shift position sensor 46, an actuated position signal S2 indicating an actuated position of the selecting motor 32 as detected by a select position sensor 47, a main shaft rotational speed signal Nm from a main shaft rotational speed sensor 41, a countershaft rotational speed signal Nc from a countershaft rotational speed sensor 42, a throttle opening signal θth from a throttle opening sensor 43, an engine rotational speed sensor Ne from an engine rotational speed sensor 44, an accelerator opening signal θac from an accelerator opening sensor 45, and a main clutch stroke position signal Clp from a clutch stroke sensor 58.

Based on the supplied signals, the controller CU controls the electric motor 51 and the electromagnetic brake 60 to control the main clutch MC, and also controls the shifting motor 31 and the selecting motor 32 to make a gear shift.

The clutch control system according to the present invention is incorporated in the transmission control apparatus for controlling the main clutch MC with the electric actuator 50 when the automobile is started, for example.

Figure 7:
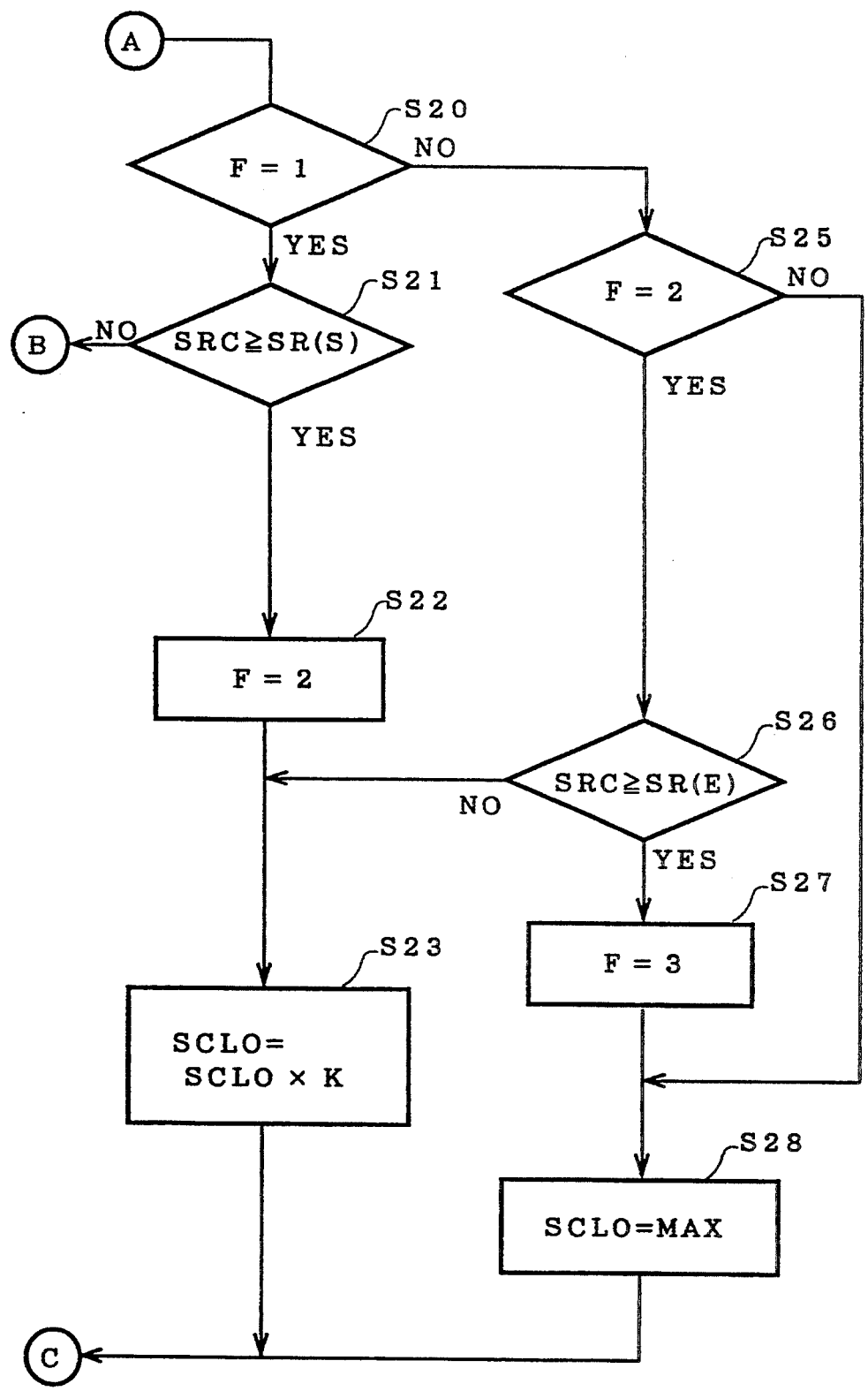
Figure 8:
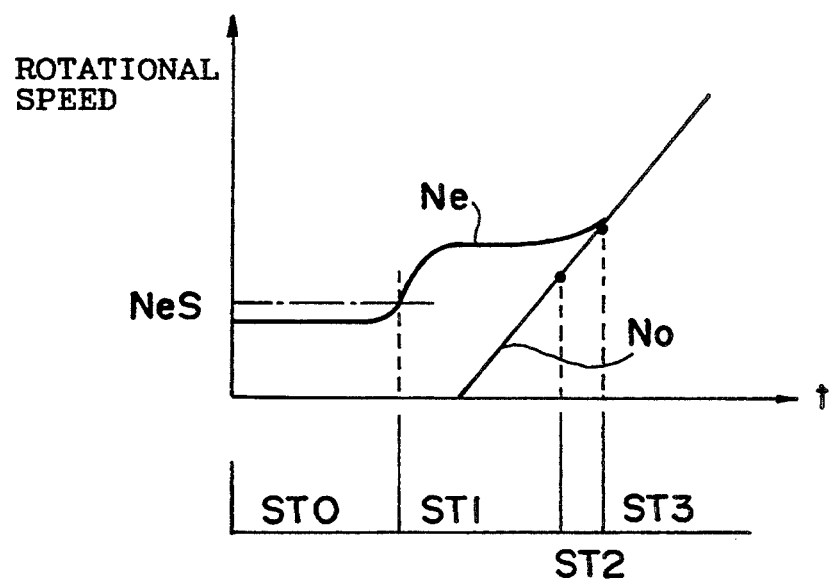
FIG. 8 is a graph showing the rotational speed of an engine and the rotational speed of the input shaft of the automatic transmission as they vary with time when the main clutch is controlled for engagement by the clutch control system.
Figure 9:
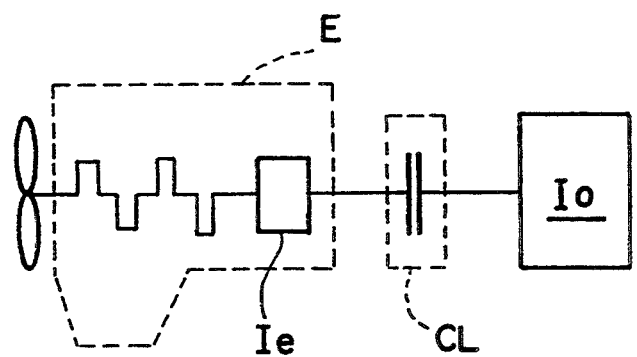
FIG. 9 is a schematic view of a model of a power transmitting system of an automobile having a clutch.

The main clutch MC is controlled by the clutch control system according to a process or control sequence shown in. FIGS. 8 and 7. The control sequence shown in FIGS. 6 and 7 is repeated executed at predetermined control cycle intervals of 10 ms, for example, by the controller CU. The controller CU determines in a step S1 whether an actual engine rotational speed NeA detected by the engine-rotational speed sensor 45 is higher than a predetermined engine rotational speed NeS that is used to determine whether the automobile is started or not. The engine rotational speed NeS is about 1000 RPM, for example, which is slightly higher than an idling speed of the engine E. When the engine E is idling, since NeA<NeS, control goes from the step S1 to a step S2 and then a step In the step S2, a flag F is set to F=0, and in the step S3, a target clutch stroke SCLO is set to an initial value, i.e., a stroke value for releasing or disengaging the main clutch MC. The electric actuator 50 is controlled to achieve the target clutch stroke SCLO. At this time, the main clutch MC is released or disengaged.

When the clutch pedal of the automobile is depressed to start the automobile, the actual engine rotational speed NeA is increased. If NeA>NeS, then control proceeds from the step S1 to a step S10 in which the controller CU determines whether the flag F is F=0 or not. If F=0, i.e., if the actual engine rotational speed NeA has just exceeded the engine rotational speed NeS, control goes from the step S10 to a step S11 in which the flag F is set to F=1. Thereafter, the controller CU executes steps S12 through S15.

In the step S12, the controller CU establishes a target rate dNeO of change for the engine rotational speed. According to the present invention, the clutch control system controls the main clutch MC such that the rate of change of the engine rotational speed is zero. Therefore, the controller CU sets the target rate dNeO of change for the engine rotational speed to dNeO=0 in the step S12. Then, in the step S13, the controller CU calculates an actual rate dNeA of change of the engine rotational speed from the actual engine rotational speed in the previous control cycle and the actual engine rotational speed in the present control cycle, and then calculates the difference ΔdNe between the target rate dNeO of change for the engine rotational speed and the actual rate dNeA of change of the engine rotational speed.

Based on the calculated difference ΔdNe, the controller CU calculates in the step S14 a target change ΔSCLO for the clutch stroke which is required to cause the actual rate dNeA of change of the engine rotational speed to approach the target rate dNeO (=0) of change for the engine rotational speed. The target change ΔSCLO is of a value required during one control cycle, and can be calculated by multiplying the difference ΔdNe by a coefficient that depends on the time period of the control cycle. If the coefficient is greater, then the actual rate of change of the engine rotational speed approaches the target rate more quickly. If the coefficient is smaller, then the actual rate of change of the engine rotational speed approaches the target rate more slowly.

In the step S15, the controller CU adds the target change ΔSCLO calculated in the step S14 to the present target clutch stroke SCLO, thus calculating a new target clutch stroke SCLO, and then controls the electric actuator 50 to achieve the new target clutch stroke SCLO, i.e., starts to engage the main clutch MC based on the new target clutch stroke SCLO.

Once the steps S12 through S15 are executed, control goes from the step S10 to a step S20 in a next cycle. In the step S20, the controller CU determines whether the flag F is F=1 or not. Since F=1 at this time, control proceeds from the step S20 to a step S21 in which the controller CU calculates an actual slip ratio SRC {=/minus(actual engine rotational speed−main shaft rotational speed)/actual engine rotational speed} namely, SRC=1−(Ne−No)/Ne of the main clutch MC, and determines whether or not the actual slip ratio SRC is equal to or greater than a slip ratio SR(S) for starting to reduce clutch shocks. If SRC=1.0, then the main clutch MC is fully engaged, and if SRC=0.0, then the main clutch MC is fully disengaged.

The slip ratio SR(S) for starting to reduce clutch shocks is of a value of 0.95, for example, close to 1.0. Thus, the step S21 serves to determine whether the main clutch MC is nearly fully engaged or not. If SRC<SR(S), and hence the slippage of the main clutch MC is still large, then control goes back to the step S12 and the controller CU continues to execute the steps S12 through S15. In this manner, the controller CU controls the clutch stroke in a feedback loop to engage the main clutch MC so that the actual rate dNeA of change of the engine rotational speed will become the target rate dNeO (=0) of change for the engine rotational speed.

If the main clutch MC is engaged until SRC≧SR(S), control goes from the step S21 to a step S22 in which the controller CU sets the flat F to F=2. Then, the controller CU multiplies the present target clutch stroke SCLO by a predetermined coefficient K, thus correcting the target clutch stroke SCLO in a step S23. This correcting step S23 is effective to vary the target clutch stroke in a manner to engage the main clutch MC very slowly. The target clutch stroke SCLO is now controlled so as to increase very slowly up to a maximum clutch stroke which is large enough to fully engage the main clutch MC.

In the next control cycle, since F=2, control goes from the step S20 through a step S25 to a step S26. In the step S26, the controller CU determines whether or not the actual slip ratio SRC is equal to or greater than a slip ratio SR(E) at which the automobile finishes its starting. The slip ratio SR(E) is of a value of 0.99, for example, indicating that the main clutch MC is almost fully engaged. Thus, the controller CU determines whether the main clutch MC is almost fully engaged or not in the step S26. If SRC<SR(E), then the controller CU continues to execute the step S23.

If SRC≧SR(E), then the controller CU sets the flag F to F=3 in a step S27 and thereafter sets the target clutch stroke SCLO to the maximum clutch stroke for fully engaging the main clutch MC in a step S28. The controller CU controls the electric actuator 50 to engage the main clutch MC based on the target clutch stroke SCLO as set to the maximum clutch stroke, thus fully engaging the main clutch MC.

In subsequent control cycles, control jumps from the step S25 to the step S28, keeping the target clutch stroke SCLO maximum to hold the main clutch MC engaged.

FIG. 8 shows the engine rotational speed Ne and the rotational speed No of the input shaft of the automatic transmission AT that is the same as the rotational speed of the output shaft of the main clutch MC, which is proportional to the speed of the automobile unless the automatic transmission AT is in a neutral position, as the speeds Ne, No vary with time, when the clutch control system carries out the above control sequence. In FIG. 8, a stage ST0 corresponds to a control phase until control goes from the step S1 to the step S10. In the stage ST0, since the automobile is at rest, the rotational speed No of the input shaft of the automatic transmission AT is No=0, and the engine rotational speed Ne is equal to the idling speed.

The accelerator pedal is thereafter depressed to start the automobile. When the engine rotational speed exceeds the rotational speed NeS, i.e., when control proceeds from the step S1 to the step S10, the stage ST0 changes to a stage ST1. In the stage ST1, the steps S12 through S15 are executed to control the main clutch MC for engagement. Because the main clutch MC actually starts being engaged a slight time delay after the electric actuator 50 has started to operate, the engine rotational speed increases during that time delay. After the main clutch MC has started being engaged, the electric actuator 50 is controlled in a feedback loop so that the rate dNeA of change of the engine rotational speed will become zero, i.e., the main clutch MC will be engaged while the engine rotational speed is constant.

If the accelerator pedal is depressed slowly to start the automobile slowly, then any increase in the engine rotational speed until the main clutch MC starts being engaged is small. If the accelerator pedal is depressed rapidly to start the automobile rapidly, then any increase in the engine rotational speed until the main clutch MC starts being engaged is large. Therefore, as the automobile is started more rapidly, the engine rotational speed at which the main clutch MC is controlled for engagement is higher, and hence the main clutch MC is engaged at higher engine output power.

When the main clutch MC is thus engaged, the torque from the engine E is transmitted through the main clutch MC to the automatic transmission AT. The rotational speed No of the input shaft of the automatic transmission AT is gradually increased, causing the automobile to start slowly.

The main clutch MC is engaged while the engine rotational speed is constant. The rotational speed No of the input shaft of the automatic transmission AT approaches the engine rotational speed Ne, and the slip ratio SRC of the main clutch MC approaches 1.0. When SRC=SR(S), the stage ST1 changes to a stage ST2 in which the step S23 is executed. The clutch stroke is controlled so as to vary very slowly to the maximum clutch stroke. The engine rotational speed is increased slowly, and the slip ratio SRC approaches 1.0 more slowly.

When SRC=SR(E), the main clutch MC is almost fully engaged, and the stage ST2 changes to a stage ST3 in which the target clutch stroke SCLO is set to the maximum clutch stroke and the main clutch MC is fully engaged. As can be seen from the graph shown in FIG. 8, the engine rotational speed Ne is equalized smoothly with the rotational speed No of the input shaft of the automatic transmission AT, allowing the main clutch MC to engage highly smoothly.

Although a certain preferred embodiment of the present invention has been shown and described in detail, it should be understood that various changes and modifications may be made therein without departing from the scope of the appended claims.

What is claimed is:

1. A control system for controlling an automotive clutch, comprising:
    a power transmitting path extending from an engine to a driven system;
    clutch means disposed in said power transmitting path for controlling transmission of power from the engine through the power transmitting path to the driven system;
    a clutch actuator for controlling said clutch means selectively for engagement and disengagement;
    control means for controlling said clutch actuator to engage said clutch means in a feedback loop at variable engine speeds such that a torque transmitted through said clutch means is equal to an engine output torque when the power from said engine starts to be transmitted through said power transmitting path by said clutch means.

2. A control system according to claim 1, wherein said control means controls said clutch actuator to engage said clutch means in a feedback loop such that a rate of change of a rotational speed of said engine approaches substantially zero, and said torque transmitted through said clutch means approaches equality with the engine output torque as said rate of change approaches substantially zero.

3. A control system for controlling an automotive clutch, comprising:
    a power transmitting path extending from a drive unit to a driven system;
    clutch means disposed in said power transmitting path for controlling transmission of power from the drive unit through the power transmitting path to the driven system;
    a clutch actuator for controlling said clutch means selectively for engagement and disengagement;
    detecting means for detecting a rate of change of a rotational speed of the drive unit; and
    control means for controlling said clutch actuator to engage said clutch means in a feedback loop such that said rate of change of the rotational speed of the drive unit is zero when the power from said drive unit starts to be transmitted through said power transmitting path by said clutch means.

4. A control system according to claim 3, wherein said drive unit comprises an engine having an output shaft, said clutch means comprising a friction clutch coupled to said output shaft of the engine and having a release bearing, said clutch actuator comprising an electric actuator for positionally controlling said release bearing of the friction clutch, said detecting means comprising an engine rotational speed sensor for detecting the rotational speed of said engine, and calculating means for calculating the rate of change of the rotational speed of said engine as detected by said engine rotational speed sensor.

5. A control system according to claim 3, wherein said control means comprises means for calculating a target amount by which said clutch means is to be engaged in order to eliminate said rate of change of the rotational speed of the drive unit as detected by said detecting means, and controlling said clutch actuator to engage said clutch means based on said target amount repeatedly at predetermined control cycle intervals.

6. A control system according to claim 5, wherein said drive unit comprises an engine having an output shaft, said clutch means comprising a friction clutch coupled to said output shaft of the engine and having a release bearing, said target amount being represented by a clutch stroke corresponding to a position of said release bearing of said friction clutch.

* * * * *